(12) United States Patent
Cai et al.

(10) Patent No.: US 10,586,070 B2
(45) Date of Patent: Mar. 10, 2020

(54) PRIVACY PROTECTION IN CAPTURED IMAGE FOR DISTRIBUTION

(71) Applicant: INTERNATIONAL BUSINESS MACHINES CORPORATION, Armonk, NY (US)

(72) Inventors: Jing Cai, Shanghai (CN); Yuan Yao Deng, Beijing (CN); Yuan Yuan J. Jia, Beijing (CN); Jing Liu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 193 days.

(21) Appl. No.: 15/811,898

(22) Filed: Nov. 14, 2017

(65) Prior Publication Data

US 2019/0147185 A1 May 16, 2019

(51) Int. Cl.
*G06K 9/46* (2006.01)
*G06F 21/62* (2013.01)
(Continued)

(52) U.S. Cl.
CPC .......... *G06F 21/6245* (2013.01); *G06F 21/32* (2013.01); *G06F 21/6254* (2013.01);
(Continued)

(58) Field of Classification Search
None
See application file for complete search history.

(56) References Cited

U.S. PATENT DOCUMENTS 8,098,904 B2 1/2012 Ioffe et al.
9,098,584 B1 * 8/2015 Fredinburg ........... G06F 16/951
(Continued)

FOREIGN PATENT DOCUMENTS

CN 105007395 A 10/2015
CN 105631417 A 6/2016
(Continued)

OTHER PUBLICATIONS

Illumination Invariant Representation for Privacy Preserving Face Identification. Moskovich et al. IEEE. (Year: 2010).*
(Continued)

*Primary Examiner* — Venkat Perungavoor
(74) *Attorney, Agent, or Firm* — Michael A. Petrocelli, Esq.; Kevin P. Radigan, Esq.; Heslin Rothenberg Farley & Mesiti P.C.

(57) ABSTRACT

Providing privacy protection in a captured image includes obtaining the captured image and image coordinates associated with one or more target individuals within the captured image. Facial recognition processing is executed against individual faces within the captured image, and one or more target individuals in the captured image are identified from the image coordinates. Representative data of the one or more target individuals is saved to a whitelist, and a privacy protected version of the captured image may be provided. The privacy protected version of the captured image has one or more altered image features associated with one or more other individuals within the captured image then the one or more target individuals.

17 Claims, 8 Drawing Sheets

(51) Int. Cl.
*G06T 11/60* (2006.01)
*G06K 9/00* (2006.01)
*G06F 21/32* (2013.01)
*G06K 9/36* (2006.01)

(52) U.S. Cl.
CPC ..... *G06K 9/00255* (2013.01); *G06K 9/00261* (2013.01); *G06K 9/00295* (2013.01); *G06T 11/60* (2013.01); *G06K 9/00771* (2013.01)

(56) References Cited

U.S. PATENT DOCUMENTS

| | | | |
|---|---|---|---|
| 9,282,285 B2 | 3/2016 | Winterstein et al. | |
| 9,396,354 B1 | 7/2016 | Murphy et al. | |
| 9,497,202 B1* | 11/2016 | Calo | G06F 16/5838 |
| 2011/0026781 A1* | 2/2011 | Osadchy | H04L 9/008 |
| | | | 382/118 |

FOREIGN PATENT DOCUMENTS

| | | |
|---|---|---|
| WO | 2003049035 A2 | 6/2003 |
| WO | 2013019262 A1 | 2/2013 |

OTHER PUBLICATIONS

Preserving Privacy by De-Identifying Face Images. Newton et al. IEEE. (Year: 2005).*
Privacy Tag: Privacy Concern Expressed and Respected. Bo et al. ACM. (Year: 2014).*
Face Recognition from Video: A Review. Barr et al. IJPRAI. (Year: 2012).*
Aved et al., "A General Framework for Managing and Processing Live Video Data with Privacy Protection", University of Central Florida, Published Online Aug. 6, 2011 (pp. 1-21).
Mel, et al., "The NIST Definition of Cloud Computing," National Institute of Standards and Technology, Information Technology Laboratory, Special Publication 800-145, Sep. 2011, (pp. 1-7).
Stolth, Janet, "Enhanced Privacy Blurring", www.seon.com, Feb. 29, 2012, Coquitlam, B.C., Canada (pp. 1-2).
Anonymous, "Visual Anonymity: Automated Human Face Blurring for Privacy-Preserving Digital Videos", http://pages.cs.wisc.edu/~zihao/other_resources/proposal_for_scholarship.pdf (pp. 1-5).
Korshunov et al., "Framework for Objective Evaluation of Privacy Filters", IEEE International Workshop on PErforamnce Evaluation of Tracking and Surveillance (PETS), 2013 (pp. 1-12).
International Business Machines Corporation (IBM), "z/Architecture Principles of Operation," IBM® Publication No. SA22-7832-10, Eleventh Edition, Mar. 2015, (pp. 1-1732).
International Business Machines Corporation (IBM), "Power ISA™ Version 2.07B," Apr. 9, 2015, (pp. 1-1527).
Price, Rob, "Snapchat has Figured Out a Way to Use Facial Recognition Tech to Protect People's Privacy", www.businessinsider.com/new-snapchat-patent-uses-facial-recongition, Jul. 19, 2016 (pp. 1-4).
Shu et al., "Cardea: Context-Aware Visual Privacy Protection from Pervasive Cameras", arXiv:1610.00889v1 [cs.CR], Oct. 4, 2016 (pp. 1-10).
Matsunaga, Ryan, "YouTube Pro Tip: How to Automatically Blur All Faces in Your YouTube Videos <<Digiwonk :: Gadget Hacks", https://digiwonk.gadgethacks.com, [Retrieved from Internet Aug. 22, 2017] (pp. 1-3).

* cited by examiner

PRIVACY PROTECTION IN CAPTURED IMAGE FOR DISTRIBUTION

BACKGROUND

An imaging device, such as a camera, smartphone, tablet or other device with image and/or video capturing capabilities, is an instrument capable of recording or capturing images. The images may be individual still images, such as photographs, or sequences of images, constituting a video.

The wide availability of imaging devices today has created privacy concerns. For instance, many individuals are in position to take and distribute images, including live streaming video, which may secondarily include one or more individuals without the consent of those individuals appearing within the captured images.

SUMMARY

Certain shortcomings of the prior art are overcome and additional advantages are provided through the provision, in one or more embodiments, of a computer-implemented method which includes obtaining a captured image and image coordinates associated with one or more target individuals within the captured image, and executing facial recognition processing against individual faces within the captured image. Further, the method includes identifying the one or more target individuals in the captured image from the received image coordinates, and saving representative data of the one or more target individuals to a whitelist. The method also includes providing a privacy protected version of the captured image, where the privacy protected version of the captured image has one or more altered image features associated with one or more other individuals within the captured image than the one or more target individuals.

Systems and computer program products relating to one or more aspects are also described and claimed herein. Further, services relating to one or more aspects may also be described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired by a particular application, for instance, to facilitate providing a privacy protected version of a captured image.

The illustrative embodiments may be described using specific code, designs, architectures, protocols, layouts, schematics, or tools only as examples, and are not limiting to the illustrative embodiments. Furthermore, the illustrative embodiments are described in some instances using particular software, tools, and data processing environments only as example for clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

As used herein, an imaging device refers to any device, apparatus, system, subsystem, component, module, etc. designed for or capable of capturing an image, with cameras, smartphones, tablets, etc., being examples of an imaging device. Note further that "imaging device" and "image"

referred to herein are also inclusive of a video capture device, or video, respectively.

Figure 1:
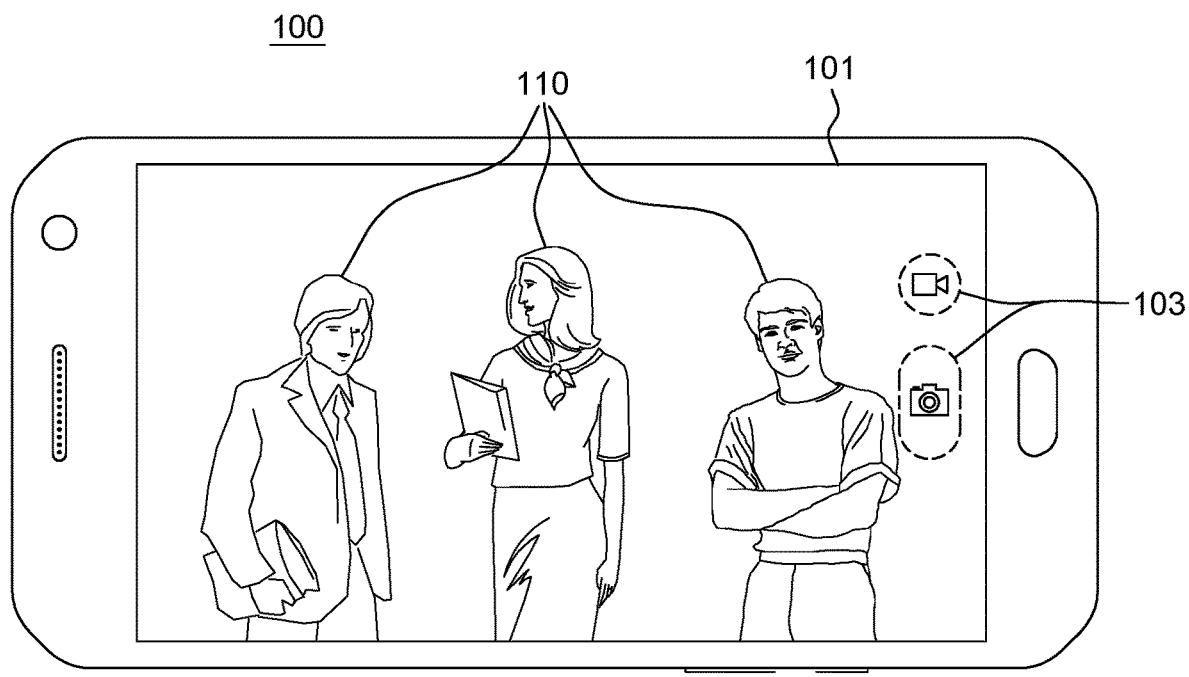
FIG. 1 depicts one embodiment of an imaging device capturing an image that includes a target individual and one or more other individuals whose privacy is to be protected, in accordance with one or more aspects of the present invention.

FIG. 1 depicts one embodiment of an imaging device 100, such as a smartphone, tablet, etc. Imaging device 100 is shown to include imaging capabilities, such as one or more cameras, and to have a display 101, and one or more camera controls 103. As shown, during image capture one or more objects and/or individuals 110 within the image may appear within the display, and thus, within the captured imaged. Depending on the subject being captured, one or more individuals may be secondarily included within the captured image. With the popularity of smartphone type imaging devices for producing and live streaming video, privacy concerns have become more important, especially for those individuals who are not the target of the video.

Figure 2:
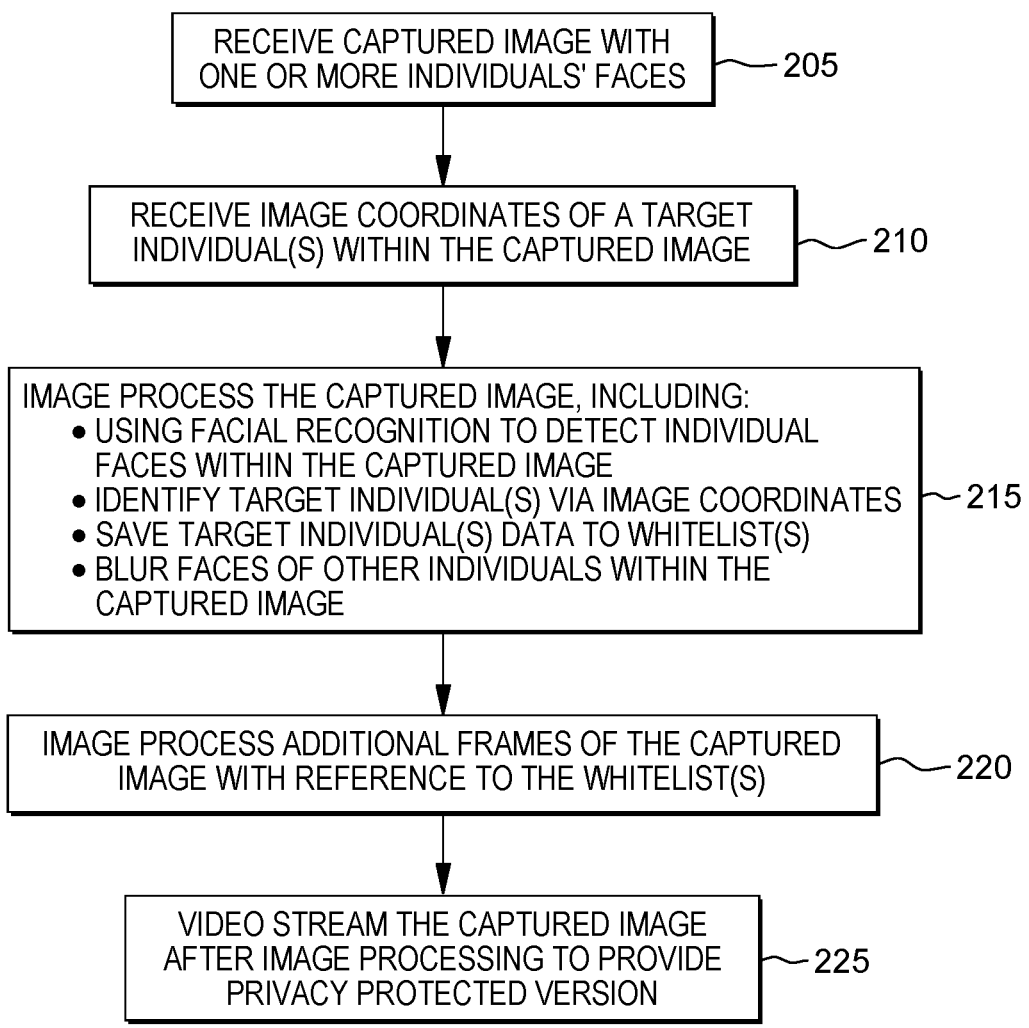
FIG. 2 depicts one embodiment of processing, in accordance with one or more aspects of the present invention.

Disclosed herein are a method, system and computer program product for providing privacy protection in captured images. FIG. 2 depicts one embodiment of a process 200, in accordance with one or more aspects. In the embodiment depicted, process 200 includes obtaining or receiving a captured image with one or more individuals' faces depicted within the captured image 205. As noted, the captured image may include a series of image frames, such as occurs in a video. Also obtained or received are image coordinates of one or more target individuals within the captured image 210. Image processing is performed on the captured image 215, which includes using facial recognition to detect individual faces within the captured image, and identifying the one or more target individuals via the image coordinates received. Representative data associated with the target individual(s) is saved to a whitespace or whitelist, and one or more image features associated with one or more other individuals than the target individuals are altered, such as by blurring faces of the other individuals within the captured image. Subsequent image frames of the captured image may then be processed with reference to the whitelist by, for instance, comparing the representative data in the whitelist to the individual faces within the subsequent image frames 220. A privacy protected version of the captured image may then be distributed, such as video streamed to one or more recipients 225.

Figure 3:
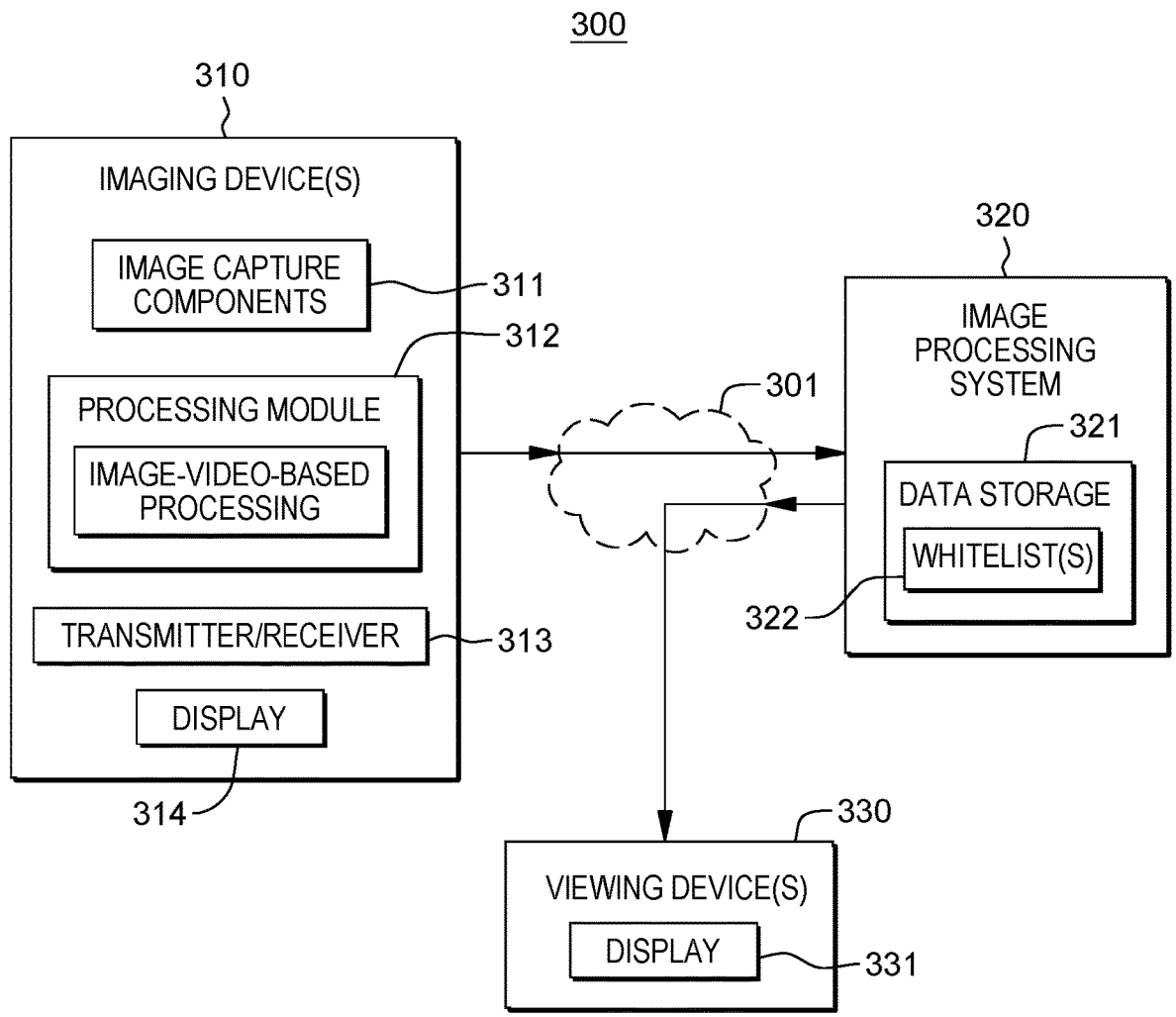
FIG. 3 depicts one embodiment of a system including one or more imaging devices and an image processing system for privacy protection, in accordance with one or more aspects of the present invention.

By way of example only, FIG. 3 depicts one embodiment of a system 300, in accordance with one or more aspects of the present invention. As shown, system 300 may include one or more imaging devices 310, a network 301, one or more image processing systems 320, and one or more viewing devices 330, which may be the same or different from the one or more imaging devices 310. In one or more embodiments, imaging device(s) 310 may include image capture components 311, such as conventional image or video camera components, a processing module 312, which may include image or video-based processing, such as disclosed herein for identifying image coordinates associated with one or more target individuals within a captured image, a transmitter/receiver for transmitting or receiving data, such as across a network 301, and a display 314. Note that imaging device 310 may include many additional components, modules, subsystems, etc., without departing from the spirit of the present invention.

In one or more implementations, imaging device 310 may transmit one or more captured images to imaging processing system 320. For instance, transmitter/receiver 313 of imaging device 310 may transfer, via wired or wireless interface, one or more captured images across communications network 301 to image processing system 320, as well as image coordinates associated with one or more targeted individuals within the captured image(s). Image processing system 320 may be a remote system or service, such as a cloud-based platform, which includes or accesses data storage 321 having one or more whitelists 322, such as discussed herein. In particular, whitelist(s) 322 may store representative data of one or more target individuals within the captured image whose image is to remain unaltered in the privacy protected version of the captured image. In one or more embodiments, image processing system 320 may distribute (for instance, provide or publish) a privacy protected version of the captured image, where the privacy protected version of the captured image has one or more altered image features associated with one or more other individuals within the captured image than the one or more target individuals. The distribution may be to one or more viewing devices 330, which may include respective displays 321. In one or more embodiments, viewing devices 330 may themselves be imaging devices, such as smartphones, tablets, etc.

Figure 4:
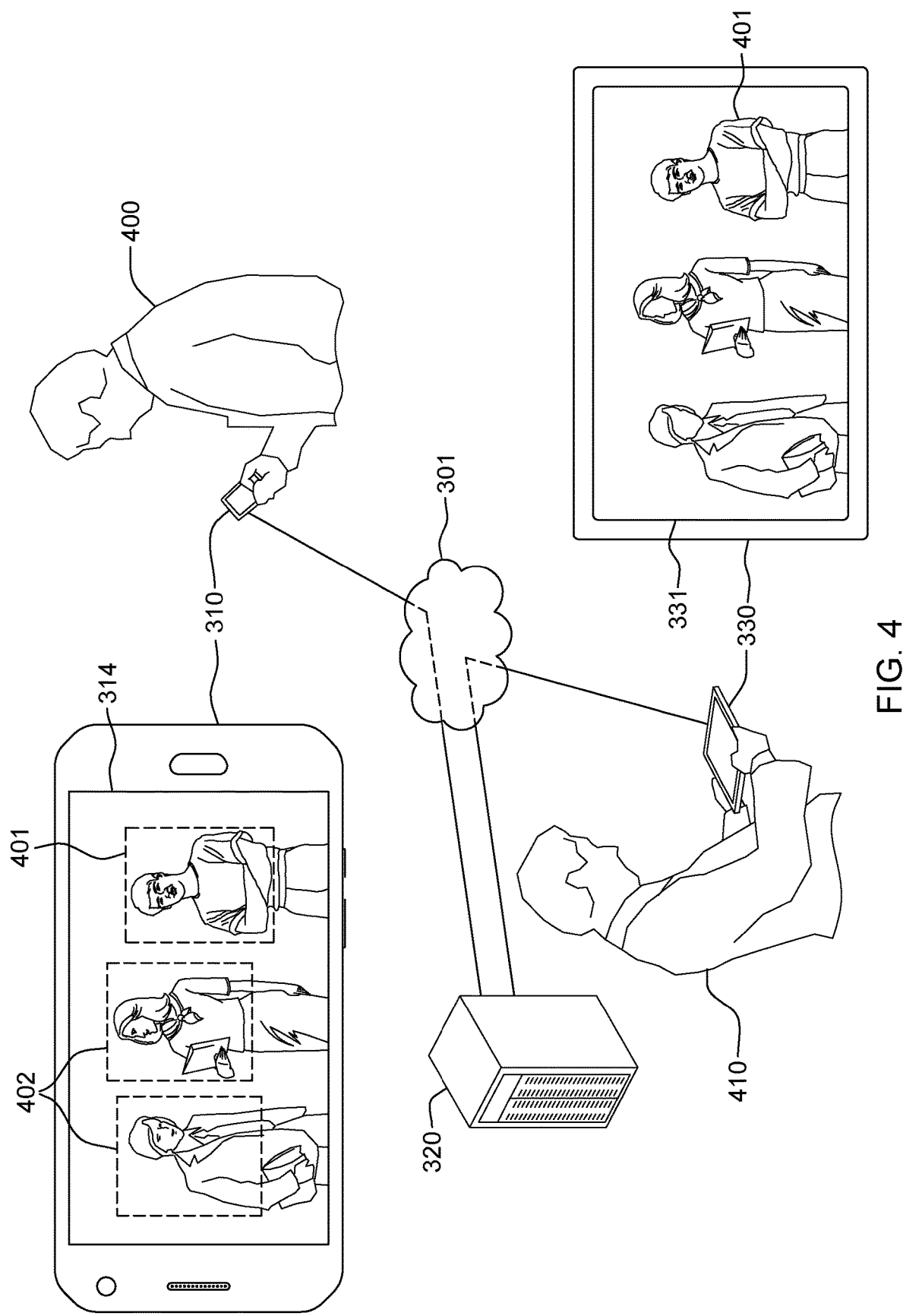
FIG. 4 is an operational representation of one embodiment of processing, in accordance with one or more aspects of the present invention.

FIG. 4 depicts one operational example of a system, such as described above in connection with FIG. 3. A user 400 has an imaging device 310 which includes a display 314. The user may capture an image which includes multiple individuals, in this case including a target individual 401 and multiple other individuals 402. The captured image may be, in one or more embodiments, a live streaming video segment. The user 400 may identify to the system the target individual 401 by, for instance, clicking on target individual 401 on display 314, in the case where the screen is a touchscreen display. In one or more embodiments, a touchscreen display or monitor includes a resistive system that includes a normal glass panel covered with a conductive layer and a resistive metallic layer. These layers are held apart by spacers, and a scratch resistant layer is typically placed on top of the setup. An electrical current runs through the two layers while the display or monitor is operational. When the user touches the screen, the two layers make contact in that spot. The change in the electrical field is noted, and the coordinates of the point of contact may be determined by the imaging device. Once the coordinates are known, a driver within the imaging device may translate the point(s) of contact into data that an operating system can process, similar to how a computer mouse driver translates a mouse's movements into a click and drag action. When the user taps or clicks (for instance, double clicks) on the one or more target individuals on the imaging device screen while capturing the image, for instance, while capturing a video, the imaging device itself may determine the image coordinates of the targeted individuals relative to the whole display, and transmit the data as image coordinates associated with the one or more targeted individuals to, for instance, the image processing system 320, which as noted, may be in one or more embodiments a cloud-based system to process images. Transmission of the captured image and the image coordinates may be across network 301 to image processing system 320.

Image processing system 320 receives the captured image and image coordinates associated with the one or more targeted individuals within the captured image, and in one or more implementations, executes facial recognition processing against individual faces within the captured image. The one or more target individuals in the captured image are identified from the received image coordinates. For instance, the image processing system 320 identifies target individual 401 through the coordinate points received, and the system saves representative data of the one or more targeted individuals to a whitelist. For instance, the facial representation of the target individual(s) may be saved into a faces whitelist. Any other individuals within the captured image may have one or more image features associated therewith altered. For instance, the image processing system 320 may blur facial images of the one or more other individuals within the captured image. The resultant privacy protected version of the captured image may then be provided, for instance, for distribution to one or more recipients 410 of the image for viewing on one or more viewing devices 330. As shown, only the target individual 401 in this case has unaltered image features within the provided privacy protected version of the captured image depicted on display 331 of view device 330.

Figure 5:
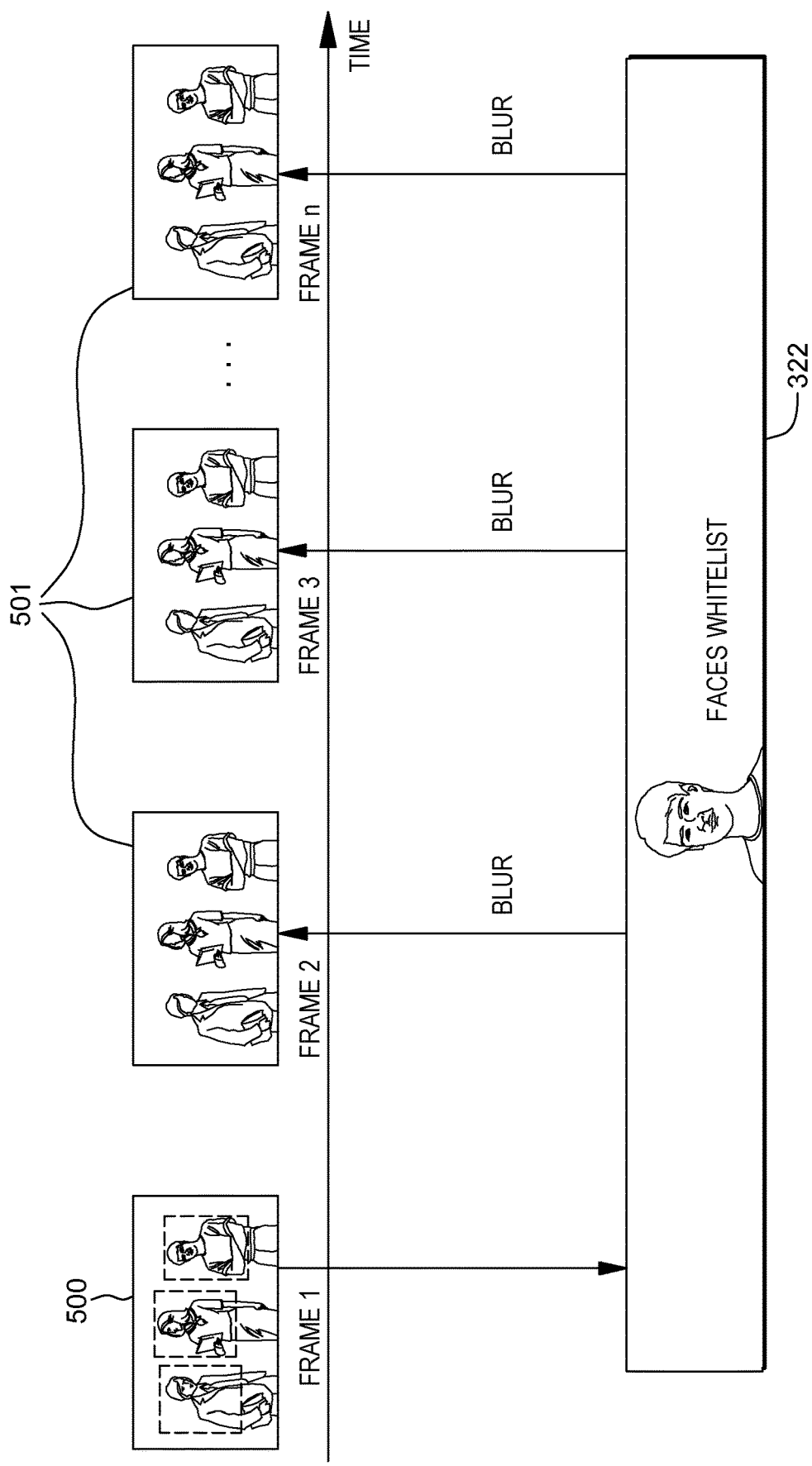
FIG. 5 is a further operational representation of one embodiment of processing implemented by an image processing system, in accordance with one or more aspects of the present invention.

FIG. 5 depicts one embodiment of processing performed by the image processing system on one or more subsequent frames within the captured image. For instance, in one or more implementations, an initial image frame 500 may be provided within the captured image, along with the image coordinates associated with the one or more target individuals. As noted above, in one or more implementations, the target individual's face may be saved unaltered to a faces whitelist 322 by the image processing system. In subsequent frames, the faces whitelist 322 may be used in comparison to the received image frame to identify those target individuals whose features are to remain unaltered, while all other individuals within the image frame have by default features associated therewith altered. For instance, in one or more embodiments, the one or more other individuals may have their faces blurred within the privacy protected version of the captured image.

Advantageously, in one or more implementations, privacy of individuals is protected by default, that is, all faces in the live video or other captured image are automatically blurred by utilizing facial recognition technology, with the target individual, such as their faces, being added to a whitelist for purposes of not blurring those individuals in subsequent frames of the image.

In the case of a live video session, when starting to record a video, a user of the image device may put the target individual's faces on the main part of the screen, with the target individuals getting more focus by the imaging device's light. The imaging device may have a light sensor system that automatically detects the points of the target face area in relation to the entire screen, and transmit those area points to the image processing system, such as a backend cloud platform. This is an alternative approach to the user inputting the image coordinates associated with the one or more target individuals. That is, the image coordinates may be either device-generated coordinates, ascertained by the device inherently based upon the subject of the image, or user inputted coordinates, for instance, via a touch screen.

The image processing system may process the captured image (such as a live video stream) by detecting all individual faces in the captured image via facial recognition technology, and locating the target individual's faces through coordinate area points, which (as noted) are also received from the imaging device. The image processing system may clip the target individual's faces as representative data and save the data into a faces whitelist, that may be either maintained by the image processing system, or maintain by another storage service, such as another cloud storage service. Furthermore, if desired, the image processing system could add area points into the image file metadata or other useful key-value pair information. A privacy protected version of the captured image may then be produced by the image processing system by, for instance, blurring facial areas of the one or more other individuals within the captured video, that is the individuals other than the target individual(s).

Advantageously, disclosed herein is an image processing system which may process in real time captured images in order to distribute a privacy protected version of the captured image by, for instance, blurring faces of non-targeted individuals within the image. Privacy is ensured for all unintended individuals, since, in one or more implementations, the unintended individuals are blurred by default as long as they are not identified in the maintained whitelist. As a result, minimum storage is required in order to process the captured image, that is, storage is only required to maintain representative data on the target individual(s). Further, a live video streaming platform may be used, in combination with a cloud platform to serve as the faceless whitelist storage.

Exemplary embodiments of a computing environment which could implement one or more aspects of the present invention are described below with reference to FIGS. 6-8.

Figure 6:
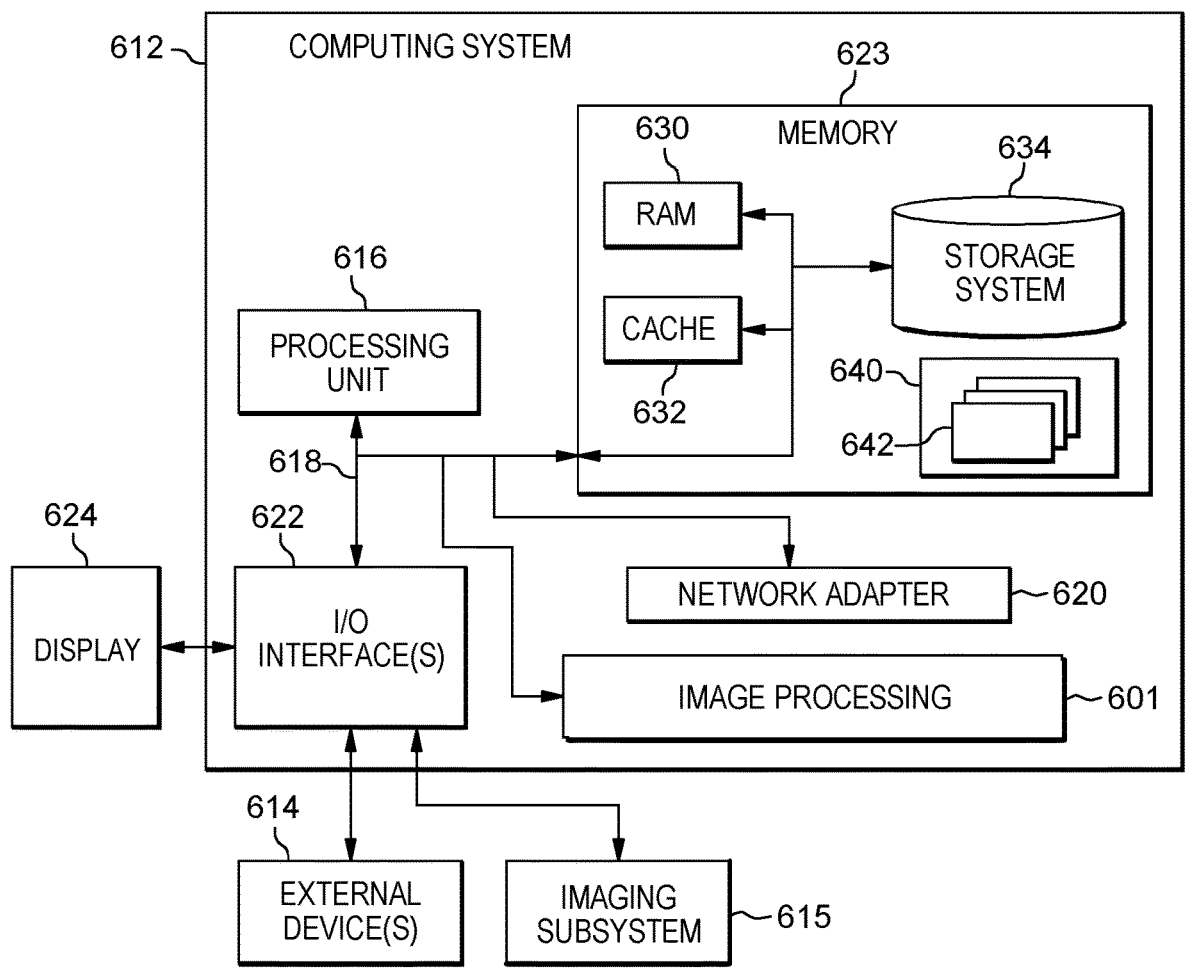
FIG. 6 depicts one embodiment of a computing system which may implement or facilitate implementing image processing, in accordance with one or more aspects of the present invention.

By way of further example, FIG. 6 depicts one embodiment of a computing environment 600, which includes a computing system 612. Examples of well-known computing systems, environments, and/or configurations that may be suitable for use with computer system 612 include, but are not limited to, a server, a desktop computer, a work station, a mobile device, such as a wireless computer, a handheld or laptop computer or device, a mobile phone, a programmable consumer electronic device, a tablet, a personal digital assistant (PDA), or the like.

Computing system 612 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 6, computing system 612, is shown in the form of a general-purpose computing device. The components of computing system 612 may include, but are not limited to, one or more processors or processing units 616, a system memory 623, and a bus 618 that couples various system components including system memory 623 to processor 616.

In one embodiment, processor 616 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 612 may include a variety of computer system readable media. Such media may be any available media that is accessible by computing system 612, and it includes both volatile and non-volatile media, removable and non-removable media.

System memory 623 can include computer system readable media in the form of volatile memory, such as random access memory (RAM) 630 and/or cache memory 632. Computing system 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 618 by one or more data media interfaces. As described below, memory 623 may include at least one program product having a set (e.g., at least one) of program modules that are configured to carry out the functions of embodiments of the invention.

Program/utility 640, having a set (at least one) of program modules 642, may be stored in memory 623 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. Alternatively, a separate image processing system, module, logic, etc., 601 may be provided within computing environment 612.

Computing system 612 may also communicate with one or more external devices 614 such as an imaging subsystem 615, a keyboard, a pointing device, a display 624, etc.; one or more devices that enable a user to interact with computing system 612; and/or any devices (e.g., network card, modem, etc.) that enable computing system 612 to communicate with one or more other computing devices. Such communication can occur via Input/Output (I/O) interfaces 622. Still yet, computing system 612 can communicate with one or more networks such as a local area network (LAN), a general wide area network (WAN), and/or a public network (e.g., the Internet) via network adapter 620. As depicted, network adapter 620 communicates with the other components of computing system, 612, via bus 618. It should be understood that although not shown, other hardware and/or software components could be used in conjunction with computing system 612. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 6. Computing system 612 of FIG. 6 may be practiced in distributed cloud computing environments where tasks are performed by remote processing devices that are linked through a communications network. In a distributed cloud computing environment, program modules may be located in both local and remote computer system storage media including memory storage devices. Computing system 612 is capable of being implemented and/or performing any of the functionality set forth hereinabove.

Figure 7:
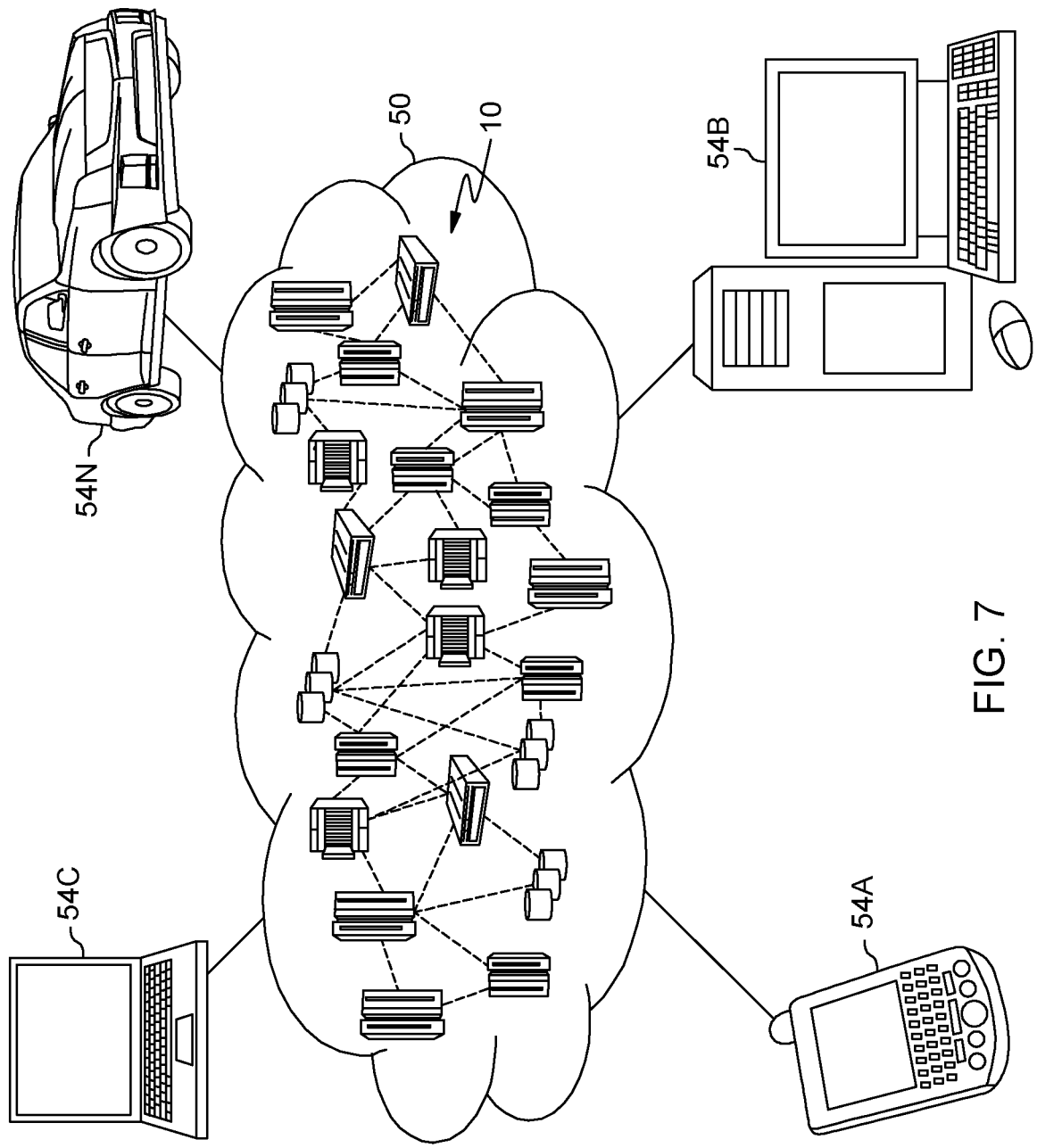
FIG. 7 depicts one embodiment of a cloud computing environment which may facilitate implementing, or be used in association with one or more aspects of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 8:
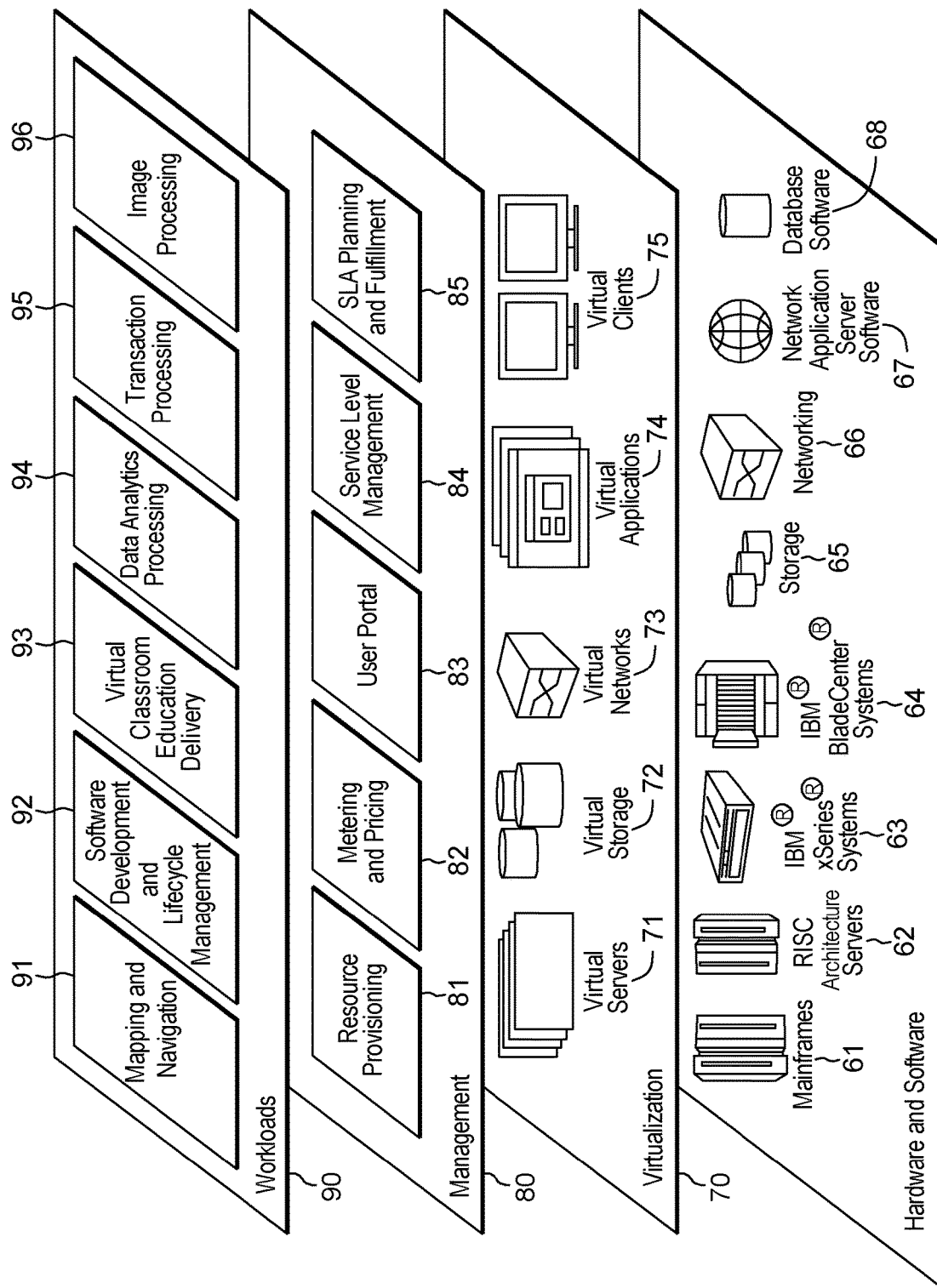
FIG. 8 depicts an example of extraction model layers, which may facilitate implementing image processing, in accordance with one or more aspects of the present invention.

Referring to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
   obtaining multiple image frames captured via a user device;
   obtaining image coordinates associated with one or more user-selected, target individuals within an image frame of the multiple image frames, the image coordinates including user-device-generated image coordinates for the one or more user-selected, target individuals in the image frame, and being absent coordinates for one or more other non-user-selected individuals in the image frame;
   executing facial recognition processing against individual faces within the image frame of the multiple image frames;
   identifying the one or more target individuals in the image frame from the received image coordinates;
   saving representative data of the one or more target individuals to a whitelist; and
   producing a privacy protected version of at least one image frame of the multiple image frames, wherein the privacy protected version of the at least one image frame has one or more altered image features associated with the one or more other individuals within the at least one image frame.

2. The computer-implemented method of claim 1, wherein the obtaining image coordinates associated with the one or more target individuals within the captured image frame comprises receiving image coordinates derived from a user input through a touch screen of the user device, the user input having selected the one or more target individuals.

3. The computer-implemented method of claim 1, further comprising processing the at least one image frame with reference to the whitelist absent the identifying and the saving for the at least one image frame to identify the one or more target individuals within the at least one image frame.

4. The computer-implemented method of claim 1, wherein saving the representative data comprises clipping, at least, individual faces of the one or more target individuals within the image frame as facial images and saving the facial images to the whitelist.

5. The computer-implemented method of claim 1, wherein the one or more altered image features comprise blurred facial images of the one or more other individuals within the image frame.

6. The computer-implemented method of claim 1, further comprising distributing the privacy protected version of the at least one image frame with the one or more altered image features associated with the one or more other individuals within the at least one image frame.

7. The computer-implemented method of claim 1, wherein the multiple image frames are image frames of streaming video.

8. A system for providing privacy protection in a captured image, the system comprising:
   a memory; and a processing circuit communicatively coupled to the memory, wherein the system performs a method comprising:

obtaining multiple image frames captured via a user device;

obtaining image coordinates associated with one or more user-selected, target individuals within an image frame of the multiple image frames, the image coordinates including user-device-generated image coordinates for the one or more user-selected, target individuals in the image frame, and being absent coordinates for one or more other non-user-selected individuals in the image frame;

executing facial recognition processing against individual faces within the image frame of the multiple image frames;

identifying the one or more target individuals in the image frame from the received image coordinates;

saving representative data of the one or more target individuals to a whitelist; and producing a privacy protected version of at least one image frame of the multiple image frames, wherein the privacy protected version of the at least one image frame has one or more altered image features associated with the one or more other individuals within the at least one image frame.

9. The system of claim 8, wherein the obtaining image coordinates associated with the one or more target individuals within the image frame comprises receiving image coordinates derived from a user input through a touch screen of the user device, the user input having selected the one or more target individuals.

10. The system of claim 8, wherein the system further performs processing the at least one image frame with reference to the whitelist absent the identifying and the saving for the at least one image frame to identify the one or more target individuals within the at least one image frame.

11. The system of claim 8, wherein saving the representative data comprises clipping, at least, individual faces of the one or more target individuals within the image frame as facial images and saving the facial images to the whitelist.

12. The system of claim 8, wherein the one or more altered image features comprise blurred facial images of the one or more other individuals within the image frame.

13. The system of claim 8, wherein the system further distributes the privacy protected version of the at least one image frame with the one or more altered image features associated with the one or more other individuals within the at least one image frame.

14. A computer program product for facilitating privacy protection in a captured image, the computer program product comprising:

a computer readable storage medium having computer readable program code embodied therewith, the computer readable program code being executable by a processor to perform a method comprising:

obtaining multiple image frames captured via a user device;

obtaining image coordinates associated with one or more user-selected, target individuals within an image frame of the multiple image frames, the image coordinates including user-device-generated image coordinates for the one or more user-selected, target individuals in the image frame, and being absent coordinates for one or more other non-user-selected individuals in the image frame;

executing facial recognition processing against individual faces within the image frame of the multiple image frames;

identifying the one or more target individuals in the image frame from the received image coordinates;

saving representative data of the one or more target individuals to a whitelist; and producing a privacy protected version of at least one image frame of the multiple image frames, wherein the privacy protected version of the at least one image frame has one or more altered image features associated with the one or more other individuals within the at least one image frame.

15. The computer program product of claim 14, wherein the obtaining image coordinates associated with the one or more target individuals within the image frame comprises receiving image coordinates derived from a user input through a touch screen of the user device, the user input having selected the one or more target individuals.

16. The computer program product of claim 14, wherein the method further comprises processing the at least one image frame with reference to the whitelist absent the identifying and the saving for the at least one image frame to identify the one or more target individuals within the at least one image frame.

17. The computer program product of claim 14, wherein saving the representative data comprises clipping, at least, individual faces of the one or more target individuals within the image frame as facial images and saving the facial images to the whitelist.

* * * * *